United States Patent [19]
Von Lempke

[11] Patent Number: 6,007,861
[45] Date of Patent: Dec. 28, 1999

[54] PROCESS FOR THE PREPARATION AND THE PACKAGING OF SOYA BASED FOODSTUFF

[76] Inventor: Frederick Ernst Von Lempke, 170 Derby Road, Kensington, Johannesburg 2094, South Africa

[21] Appl. No.: 08/953,461

[22] Filed: Oct. 17, 1997

[51] Int. Cl.$^6$ .................................................. A23L 3/3409
[52] U.S. Cl. ......................... 426/412; 426/106; 426/407; 426/508; 426/634
[58] Field of Search ..................................... 426/615, 634, 426/412, 106, 407, 507, 506, 508

[56] References Cited

U.S. PATENT DOCUMENTS

| | | | |
|---|---|---|---|
| 4,857,357 | 8/1989 | Ammann | 426/634 |
| 5,145,700 | 9/1992 | Von Lempke | 426/634 |

FOREIGN PATENT DOCUMENTS

| | | | |
|---|---|---|---|
| 62-247 | 6/1987 | Japan | 426/412 |

*Primary Examiner*—David Lacey
*Assistant Examiner*—Hao Mai
*Attorney, Agent, or Firm*—Olson & Hierl, Ltd.

[57] ABSTRACT

This invention relates to a process for preparing a soya based foodstuff suitable as a taste alike replacement and substitute for meat based produce. The process includes the steps of providing a partially prepared soya based foodstuff, of predetermined mass and volume, having a solid constituent and a fluid constituent respectively at a predetermined mass and volume ratio, the solid constituent including soya concentrate at a predetermined percentage dehydration; and sealing the foodstuff in a container of predetermined volume thus enabling the solid constituent to absorb the fluid constituent at least partially, allowing the solid constituent to expand in the container volume to a predetermined degree in accordance with the percentage dehydration and the container volume so that the solid constituent is compressed to a predetermined and required extent. A corresponding process for packaging a soya based foodstuff suitable as a taste alike replacement and substitute for meat based produce as well as a corresponding soya based foodstuff are also provided.

17 Claims, No Drawings

PROCESS FOR THE PREPARATION AND THE PACKAGING OF SOYA BASED FOODSTUFF

BACKGROUND OF THE INVENTION

This invention relates to a process for preparing and packaging soya based foodstuffs. More particularly but not exclusively, the invention relates to a process suitable for the preparation and the packaging of soya based foodstuffs such as taste alike replacements and/or substitutes for meat based produce and to the prepared and packaged foodstuffs.

The use of raw and/or processed soya concentrate in the preparation of taste-alike proteinaceous substitutes for meat based produce, or so called meat analogues, is well known. A disadvantage, however, of these soya based foodstuffs presently available is that the foodstuffs to date only have had limited acceptance, due to various factors including texture and/or taste unacceptability, flavour fatigue, crumbling and/or disintegration of formed portions such as patties, meatballs, stew chunks and the like as well as inconsistency of such processed meat substitutes for corned-hash, meat loaves and sausages.

For the purposes of this invention the term "soya based foodstuffs" must be interpreted to mean foodstuffs using "raw soya concentrate" and/or "processed soya concentrate" as basis. Further, the term "raw soya concentrate" must be interpreted to mean textured soya concentrate "TSC", textured vegetable protein "TVP" or soya isolate, commonly available from crushed soya beans which have been defatted and de-husked, or any combination of two or more thereof. Similarly, the term "processed soya concentrate" must be interpreted to mean raw soya concentrate wherein substantially all the undesirable soluble carbohydrates and proteinaceous inhibitors have been removed from the concentrate. The undesirable soluble carbohydrates typically will include raffinose, stachyose and verbascose, while undesirable proteinaceous inhibitors will include anti-tryptic factors such as Kunitz factors and Bowman-Birk factors.

It is accordingly an object of this invention to provide a process suitable for the preparation and packaging of soya based foodstuffs such as taste alike replacements and/or substitutes for meat based produce aimed at overcoming or at least minimising the above disadvantages as well as to provide such packaged foodstuffs.

DETAILED DESCRIPTION OF THE PRESENT INVENTION

According to a first aspect of the invention there is provided a process for preparing soya based foodstuffs suitable as taste alike replacements and/or substitutes for meat based produce including the steps of:

providing a partially prepared soya based foodstuff, of predetermined mass and volume, having a solid constituent and a fluid constituent respectively at a predetermined mass and volume ratio, the solid constituent including soya concentrate at a predetermined percentage dehydration; and sealing the foodstuff in a container of predetermined volume, thus enabling the solid constituent to absorb the fluid constituent at least partially, allowing the solid constituent to expand in the container volume to a predetermined degree in accordancerwith the percentage dehydration and the confinement so that the solid constituent is compressed to a predetermined and required extent.

The solid constituent may consist of a plurality of individual portions, the portions capable of expanding individually in accordance with their individual shapes and configurations to a predetermined and required degree, thus allowing for the compression of individual portions in the confined container volume.

The expansion may be to such an extent that it leads to a predetermined and required degree of fusion between the individual portions in the confined container volume.

The soya based foodstuff may be prepared partially from a soya mixture containing raw and/or processed soya concentrate. The soya concentrate is preferably dehydrated processed soya concentrate. The soya concentrate preferably has a protein quality equivalent to a net protein utilization value "NPU" of at least 60 percent by mass. Alternatively, the soya concentrate may have a predetermined protein efficiency ratio "PER" of about 200 percent by mass (2.0).

The soya mixture further may include any one or more of the ingredients selected from the group consisting of flavourants, amino acid supplements, spices and vitamins so as to enhance the overall characteristics and quality of the final foodstuff.

The flavourants are preferably organic.

The soya mixture may have a predetermined vitamin content, and preferably has a variety and an amount of vitamins in accordance with the various meat based produce to be substituted and/or the nutritious requirements of the end consumers.

The soya mixture also may include cake flour, binders such as albumen and wheat gluten, and minerals such as salt, zinc, iron and/or potassium so as to enhance the overall characteristics and quality of the final foodstuff.

The soya mixture further may include sodium chloride, and preferably between 0.05 and 3.0 percent by mass of the final soya mixture.

The soya mixture may be mixed with and soaked in a saline solution, preferably heated, for a predetermined period so as to rehydrate the dehydrated soya concentrate.

The soya mixture then may be subjected to a first cooking stage, preferably at a temperature of about 160 to 200° C. for a predetermined period in a cooking agent. This cooking stage preferably enables the soya mixture to dehydrate, by shedding of the absorbed saline solution, to about 70 to 85 percent of its initial mass as well as enables it simultaneously to substitute the shed solution with the cooking agent, preferably fat or oil.

The soya mixture then may be mixed with water, preferably water at a temperature of about 10 to 15° C., so as to render the mixture workable and thus formable.

The soya mixture then may be subjected to a forming step, wherein the mixture is formed into a plurality of portions in predetermined shapes and configurations such as patties, sausages, meatballs, stew chunks and the like.

The portions then may be subjected to a second cooking stage wherein the portions are further cooked, preferably continuously with a conveying means through a hot bath, and more preferably at a temperature of between 170 and 220° C. for a predetermined period to enable it to dehydrate to about 85 to 93 percent of its mass. The cooking agent may be oil orefatt and preferably contains ingredients such as spices, flavourants and the like.

The preparation process preferably includes a third cooking step wherein the sealed container is subjected to heat at a predetermined temperature and for a predetermined period so that the solid constituent can absorb a predetermined and required part of the fluid constituent in accordance with the specific foodstuff, thus providing the required absorbtion, expansion and fusion.

According to a second aspect of the invention there is provided a process for packaging a soya-based foodstuff, the process being substantially as hereinbefore defined.

According to a third aspect of the invention there is provided soya based foodstuffs, being prepared substantially as hereinbefore defined.

According to a fourth aspect of the invention there is provided soya based foodstuffs, being packaged substantially as hereinbefore defined.

A preferred embodiment of the invention will now be described by means of a non-limiting example only.

As a first preparation step and a pre-mixing stage, dehydrated soya concentrate is mixed with a composition which includes organic flavourants, amino acids supplementation and an extract of spices and vitamins to provide a soya mixture.

Numerous organic flavourants are used to constitute a particular flavour for example, the taste of beef. By means of trial and error, combinations of different organic flavourants are tested for a desirable flavour, and then, further tested for "flavour fatigue".

The soya concentrate in its original form consists of about 50 percent by mass protein on a dry basis, the balance being carbohydrates, fibre and ash.

The flavourants which form part of the composition in the pre-mixing stage, are organic spices. Extracts of spices are used, the use of which render the foodstuff substantially bacteria free, thus improving the shelf-life of the foodstuff. However, if natural spices of strictly controlled quality are obtainable they also can, be used in the composition and for the purpose of this specification can be considered to be extracts of spices. Extracts of spice s will also, for the purposes of this specification include extracts of fresh vegetables for example onion.

The variety and amount of vitamins used are typically determined so as to closely resemble and even exceed that of the meat based produce that the foodstuffs are intended to resemble.

It is envisaged that cake flour, binders such as egg albumen and wheat gluten, and minerals such as salt, zinc, iron or potassium can form part of the composition of the pre-mixing stage.

Typically, a dehydrated soya concentrate of TSC (textured soya concentrate) and TVP (textured vegetable protein) is pre-mixed with a composition which includes
(a) a flavourant composition in accordance with the specific foodstuff (2.8% m/m),
(b) protein quality supplementation,
(c) fresh onion (7.0% m/m),
(d) a vitamin mix (0.7%m/m) of nicotinic acid, riboflavin, ascorbic acid, vitamin A acetate, vitamin B6 and vitamin B12,
(e) egg albumen (5.8% m/m) and wheat gluten (0.4% m/m) as binders, and
(f) cake flour (5.0% m/m).

All percentages are by mass of the total soya based foodstuffs, including the soya concentrate.

A second preparation step is the mixing stage. Here the dry product of the pre-mixing stage is mixed with water and between 0,05 and 3,0 percent sodium chloride by mass, based on the total mass of the soya mixture and water.

The soya mixture is then allowed to soak in the saline solution for a sufficient period so as to allow the soya mixture to rehydrate to a predetermined degree as well as to absorb the flavourants and retain them during subsequent processing. Typically, the soaking period will be between 15 and 20 minutes.

The soya mixture is then subjected to a first cooking stage at a temperature of about 160 to 200° C. in oil or fat, the mixture shedding about 15 to 30 percent of its mass in the absorbed saline solution and replacing it with oil or fat.

The mixture is then mixed with cold water of about 10° C. to render the mixture workable and-thus formable.

The soya mixture is then put into a forming machine which forms the soaked soya mixture into shaped portions which resemble the substituted meat based produce such as patties, meat balls, stew chunks, sausages, corned-hash and the like.

The next preparation step is the second cooking stage. The purpose of this stage is to form a crust or "seal" around the portions, thus "sealing in" and enhancing the flavourants. The cooking is typically carried out by means of a conveyor frier, using vegetable oil or animal fat, operating at a temperature between 175 and 195° C.

It is envisaged that the oil or fat contains further organic flavourants and extract of spices. The shaped portions are cooked until they have obtained a mass loss of about 8 to 15 percent by mass due to dehydration, and an oil or fat content of about 18 to 25 percent by mass.

The cooked solid constituent, consisting of a plurality of shaped portions dehydrated to a predetermined degree, can now be packaged in sealable containers of predetermined volume with a fluid constituent in a predetermined volume and mass ratio, so as to provide the predetermined degree of expansion, compression and fusion of and between the various shaped portions.

Typically and for a 850 gram can, 7 patties of about 90 grams each can be packaged together with a liquid constituent of about 220 grams. Similarly and for the same can, 8 meat balls of about 50 grams each can be packaged together with a liquid constituent of about 420 grams.

It is envisaged that the mass an volumetric ratios between the solid constituent and the liquid constituent can be predetermined and selected so as to provide a final soya based foodstuff consisting of a plurality of shaped portions, alternatively, a single solid constituent that have expanded and thus been compressed and fused in the confined can volume to a predetermined and required extent.

It is envisaged that the fluid constituent constitutes a sauce, typically consisting of a soya concentrate with the amino acid supplementation together with additional flavourants for example chili, curry, tomato and onion, beef and onion, steak and onion etc.

The packaged foodstuffs, typically canned, are finally subjected to heat as an extension of the second cooking step for a predetermined period at a temperature of about 170 to 220° C.

When the packaged solid constituent is cooked in the fluid constituent such as the sauce, further expansion of the soya based solid constituent takes place, showing a mass gain in excess of 8 percent and which can be as high as 15 percent. Typically, the 90 gram patties will expand to provide patties of about 121 grams each which have absorbed the entire liquid constituent. Similarly the 50 gram meat balls will expand to provide meat balls of about 65 grams each which have absorbed about 120 grams of the liquid constituent. Normal meat products typically will lose from 15 to 30 percent of their mass during normal cooking procedures.

This extension of the second cooking step renders the product fully prepared and packaged, the texture enhanced, succulent and juicy and substantially microbiologically sterile, with the various portions expanded, compressed and fused to the required and predetermined extent.

It will be appreciated that many variations in detail are possible without departing from the scope and/or spirit of the invention as claimed in the claims hereafter.

I claim:

1. A process for preparing a soya based foodstuff suitable as taste alike replacement and substitute for meat based produce including the steps of:

providing a partially prepared soya based foodstuff, of predetermined mass and volume, having a solid constituent and a fluid constituent respectively at a predetermined mass and volume ratio, the solid constituent including soya concentrate at a predetermined percentage dehydration and said solid constituent is a plurality of individual portions, the portions being capable of expanding individually in accordance with their individual shapes and configurations to a predetermined degree, thus allowing for the compression of individual portions in a container; and sealing the foodstuff in a container of predetermined volume to such a degree that the plurity of individual solid portions absorb the fluid constituent at least partially which causes the solid portions to expand in the container volume to a predetermined degree in accordance with the percentage dehydration and the container volume so that the solid portions are compressed to a predetermined extent and causes fusion between said individual portions in the predetermined container volume.

2. The process as claimed in claim 1 wherein the soya based foodstuff is partially prepared, prior to sealage, from a soya mixture, containing any one or more of the soya concentrates selected from the group consisting of raw soya concentrate and processed soya concentrate.

3. The process as claimed in claim 2 wherein the soya concentrate is adjusted to a protein quality equivalent to a nett protein utilization value of at least 60 percent by mass.

4. The process as claimed in claim 2 wherein the soya concentrate is adjusted to a predetermined protein efficiency ratio of about 200 percent by mass.

5. The process as claimed in claim 2 wherein any one or more of the ingredients selected from the group consisting of flavourants, amino acid supplements, spices and vitamins is added to the soya mixture so as to enhance the overall characteristics and quality of the packaged foodstuff.

6. The process as claimed in claim 2 wherein flour, binders and minerals are added to the soya mixture so as to enhance the overall characteristics and quality of the foodstuff.

7. The process as claimed in claim 2 wherein sodium chloride of between 0.05 and 3.0 percent by mass of the soya mixture is added to the soya mixture.

8. The process as claimed in claim 2 wherein the soya mixture is mixed with and soaked in a saline solution for a predetermined period, whereby said saline solution is absorbed into the soya mixture, so as to rehydrate the dehydrated soya concentrate.

9. The process as claimed in claim 8 wherein the saline solution is heated.

10. The process as claimed in claim 8 wherein the soya mixture is subjected to at least two cooking stages and wherein a first cooking stage is carried out at a temperature of about 160 to 200° C. for a predetermined period in a cooking agent.

11. The process as claimed in claim 10 wherein the soya mixture is dehydrated, by shedding of the absorbed saline solution, to about 70 to 85 percent of its initial mass, as well as enabled simultaneously to substitute the shed solution with the cooking agent during the first cooking stage.

12. The process as claimed in claim 10 wherein the soya mixture is mixed with water at a temperature of between about 10 and about 15° C. so as to render the mixture workable and thus formable.

13. The process as claimed in claim 10 wherein the soya mixture is subjected to a forming step, wherein the mixture is formed into a plurality of portions of predetermined shapes and configurations selected from the group consisting of patties, sausages, meatballs and stew chunks.

14. The process as claimed in claim 10 wherein in the cooking stage the portions are further cooked for a predetermined period to enable each of the portions to dehydrate to about 85 to 93% of its mass.

15. The process as claimed in claim 14 wherein in a second cooking stage the portions are cooked continuously during conveyance through a cooking agent in a hot bath at a temperature of between 170 and 220° C.

16. The process as claimed in claims 11 or 15 wherein the cooking agent is oil, containing ingredients including spices and flavourants.

17. The process as claimed in claim 10 including a third cooking step wherein the sealed container is subjected to heat at a predetermined temperature and for a predetermined period so that the solid portions can absorb a predetermined part of the fluid constituent in accordance with the specific foodstuff, thus providing said absorption, expansion and fusion.

* * * * *